United States Patent [19]
Sergel et al.

[11] Patent Number: 5,582,664
[45] Date of Patent: Dec. 10, 1996

[54] METHOD FOR AUTOMATICALLY APPLYING AND SPLICING CUT STRIPS OF MATERIAL ON A TIRE BUILDING DRUM

[75] Inventors: Horst Sergel; Martin Kölker, both of Hanover, Germany

[73] Assignee: Continental Aktiengesellschaft, Hanover, Germany

[21] Appl. No.: 402,099

[22] Filed: Mar. 10, 1995

[30] Foreign Application Priority Data

Mar. 10, 1994 [DE] Germany .......................... 44 07 964.8

[51] Int. Cl.$^6$ .................................................. B29D 30/30
[52] U.S. Cl. ........................... 156/64; 156/130; 156/133; 156/134; 156/406.4; 156/406.6
[58] Field of Search ................................... 156/133, 134, 156/130, 130.7, 123, 406.4, 406.6, 405.1, 64

[56] References Cited

U.S. PATENT DOCUMENTS

| | | |
|---|---|---|
| 3,770,040 | 11/1973 | De Cicco . |
| 3,944,457 | 3/1976 | Podvin et al. ........................ 156/406.4 |
| 3,946,782 | 3/1976 | Petrasek et al. . |
| 4,738,743 | 4/1988 | Satoh et al. ........................... 156/405.1 |
| 4,769,104 | 9/1988 | Okuyama et al. ..................... 156/406.4 |
| 5,194,107 | 3/1993 | Okuyama et al. ........................ 156/64 |

FOREIGN PATENT DOCUMENTS

| | | |
|---|---|---|
| 0164709 | 12/1985 | European Pat. Off. . |
| 1498340 | 5/1966 | France . |
| 2227353 | 12/1972 | Germany . |
| 3213366 | 11/1983 | Germany . |

*Primary Examiner*—Geoffrey L. Knable
*Attorney, Agent, or Firm*—Robert W. Becker & Associates

[57] ABSTRACT

In a method for automatically applying cut strips of material with varying lengths onto a tire building drum for manufacturing green tires a cut strip of material, comprising a forward portion with a leading edge, a middle section, and an end portion, is fed with a conveyor belt to a tire building drum. The leading edge of the forward portion is placed onto the tire building drum, being rotated at a first circumferential speed, that is substantially identical to a first feeding speed of the conveyor belt, during application of the forward portion. The first circumferential speed of the tire building drum is increased to a second constant circumferential speed for applying the middle section. Simultaneously, the first feeding speed of the end less conveyor belt is increased to a second feeding speed which is controlled as a function of the actual length of the cut strip of material. The second constant circumferential speed is reduced to a third circumferential speed and the second feeding speed is reduced to a third feeding speed, that is substantially identical to the third circumferential speed, for applying the end portion.

5 Claims, 1 Drawing Sheet

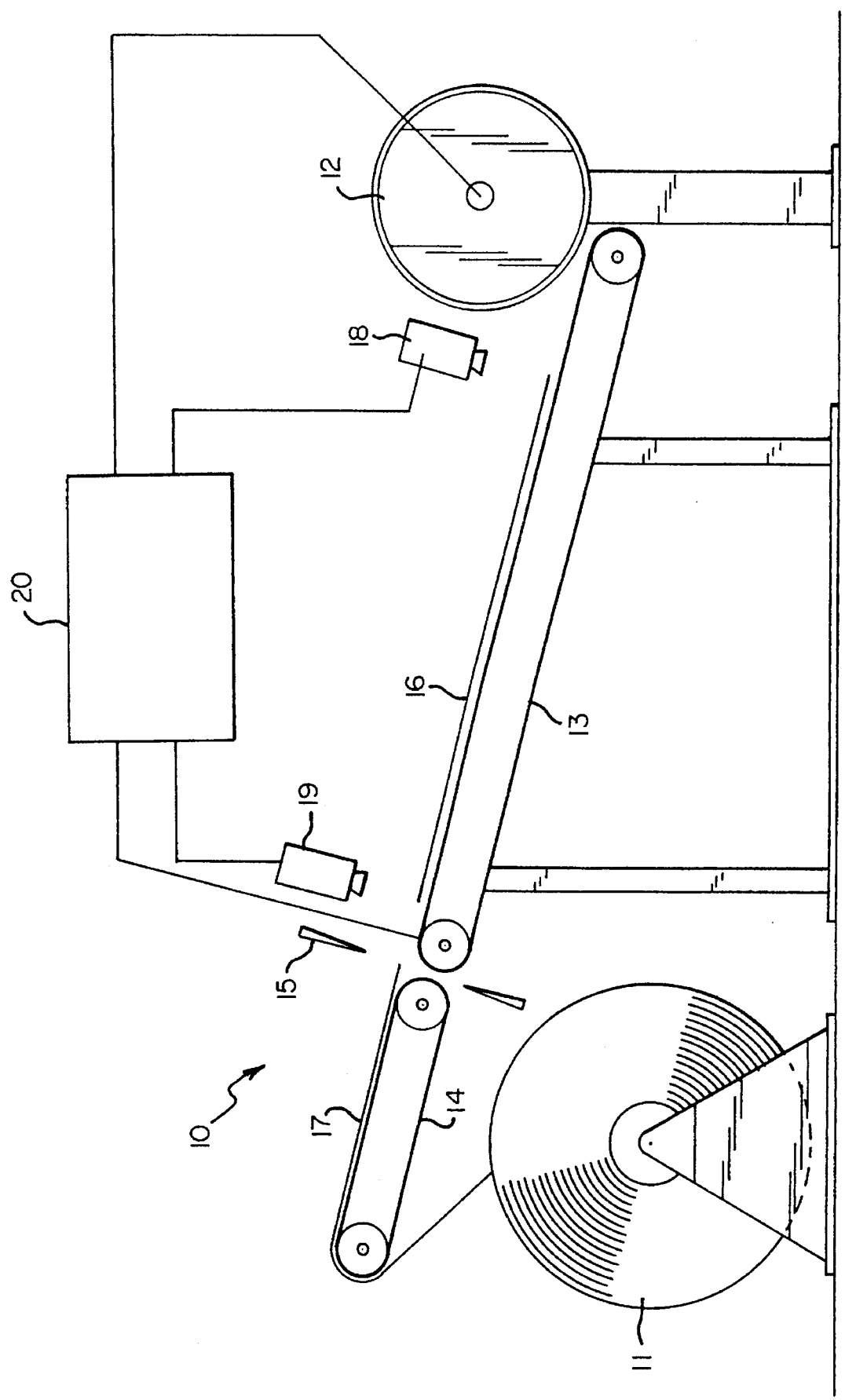

METHOD FOR AUTOMATICALLY APPLYING AND SPLICING CUT STRIPS OF MATERIAL ON A TIRE BUILDING DRUM

BACKGROUND OF THE INVENTION

The present invention relates to a method for automatically applying (placing) cut strips of material, preferably cut at a slant and having varying length tolerances, onto a tire building drum that is rotated at varying rotational speeds for splicing and manufacturing green tires. The initially endless strips of material are supplied to the tire building drum with a substantially continuous conveyor belt.

The present invention furthermore relates to a device for performing the method.

Such endless strips of material may be comprised of unvulcanized rubber reinforced with reinforcement elements extending at a slant and can be fed manually or automatically to the tire building drum. The continuous (endless) strip of material is supplied from a supply drum and cut to length with the aid of a cutting knife. The cutting knife always locates a gap between two of the reinforcement elements for the cut. Thus, cut material strips of different lengths result. The differences in length can be 10 to 20 mm. For strips of material without embedded reinforcement elements it is also possible that cutting tolerances occur.

When applying cut strips of material to a tire building drum, it may be desired to have in the final applied state a defined overlap of the ends or to have a blunt abutment of the ends. Subsequently, the latter case will be treated. When a strip of material is too long, an overlap results which represents an undesirable material accumulation. When a cut strip of material is too short, gaps between the ends result which cause undesirable material weaknesses in the finished tire. When applying the cut strips of material onto the tire building drum, they must therefore be compressed lengthwise in order to shorten them or they must be stretched in order to bridge the otherwise resulting gaps.

From German Patent 32 13 366 a method is known in which the endless strips of material are cut to a length shorter than the required length in order to subsequently stretch the cut strips of material to the desired final length over a drum of a corresponding circumference and diameter. This is disadvantageous because for each ply and each working step a different (stretching) drum must be used, respectively, the drum diameter must be changed.

From European Patent 0 164 709 a method is known in which the rotational speed of the tire building drum is adjusted corresponding to the feeding speed of the cut strip of material to be applied. In this prior art method, the actual length of the material strip is compared automatically to the nominal length that is determined by the circumference of the drum. The measurement of the length of the cut strip of material is carried out with a light beam/photocell controlled impulse counter whereby each impulse corresponds to a certain feed length. The ratio of actual length to nominal length is used to calculate a speed ratio which is supplied to a control device of the drive units for conveying the strip of material and driving the tire building drum. It is disadvantageous that the rotational speed of the tire building drum is adjusted as soon as the cut strip of material arrives thereat. Since the cut strips of material, due to the slantedly extending reinforcement elements, are cut in a diamond or rhomboid shape, pulling forces, resulting from the acceleration of the tire building drum, act on the cut strips of material first on the leading tips of the rhomboid material strips so that in this area a relatively high specific pulling load results which may cause a reduction of width of the cut strip of material.

It is therefore an object of the present invention to provide a method of the aforementioned kind with which non-uniform pulling loads and changes in width can be prevented and with which the ends of the material strips can be spliced in a controlled fashion on a tire building drum.

SUMMARY OF THE INVENTION

A method for automatically applying cut strips of material with varying length tolerances onto a tire building drum for manufacturing green tires according to the present invention is primarily characterized by the following steps:

Feeding a cut strip of material, comprised of a forward portion with a leading edge, a middle section, and an end portion, with an endless conveyor belt to a tire building drum;

Placing the leading edge of the forward portion onto the tire building drum and rotating the tire building drum at a first circumferential speed, that is substantially identical to a first feeding speed of the conveyor belt, during application of the forward portion;

Increasing the first circumferential speed of the tire building drum to a second constant circumferential speed for applying the middle section;

Increasing simultaneously the first feeding speed of the endless conveyor belt to a second feeding speed and controlling the second feeding speed as a function of the actual length of the cut strip of material; and Reducing the second constant circumferential speed to a third circumferential speed and reducing the second feeding speed to a third feeding speed, that is substantially identical to the third circumferential speed, for applying the end portion.

Advantageously, the method further comprises the steps of synchronizing the first circumferential speed and the first feeding speed and synchronizing the third circumferential speed and the third feeding speed.

In another preferred embodiment of the present invention, the method further comprises the steps of selecting the first feeding speed to be minimally lower than the first circumferential speed and selecting the third feeding speed to be minimally lower than the third circumferential speed in order to prevent bulging of the cut strip of material on the tire building drum.

Expediently, the method further comprises the step of measuring the length of the cut strip of material with an electronic measuring device.

Preferably, the step of measuring includes the step of positioning the electronic measuring device at the conveyor belt.

The present invention also relates to a device for automatically applying cut strips of material with varying length tolerances onto a tire building drum for manufacturing green tires, wherein a cut strip of material, comprising a forward portion with a leading edge, a middle section, and an end portion, is fed with an endless conveyor belt to a tire building drum, the leading edge of the cut strip of material is placed onto the tire building drum and the cut strip of material is wound onto the rotating tire building drum. According to the present invention the device is primarily characterized by:

A tire building drum comprising a first drive for rotating the tire building drum;

A conveyor belt arranged upstream of the tire building drum, the conveyor belt comprising a second drive for driving the conveyor belt;

An electronic measuring device for measuring the length of a cut strip of material;

A control device connected to the first and the second drives for controlling the circumferential speed of the tire building drum and the feeding speed of the conveyor belt, wherein during application of the forward portion of the cut strip of material the tire building drum is rotated at a first circumferential speed that is substantially identical to a first feeding speed of the endless conveyor belt, wherein, for applying the middle section of the cut strip of material, the first circumferential speed is increased to a second constant circumferential speed and, simultaneously, the first feeding speed is increased to a second feeding speed that is controlled as a function of the actual length of the cut strip of material, and wherein, for applying the end portion of the cut strip of material, the second constant circumferential speed is reduced to a third circumferential speed and the second feeding speed is reduced to a third feeding speed that is substantially identical to the third circumferential speed.

According to the present invention, the conveyor belt and the tire building drum are driven at substantially the same speed when the forward portion and the end portion of the cut strip of material to be applied to the tire building drum are being wound onto the tire building drum, whereby these speeds are lower than the speed used for applying the middle section of the cut strip of material onto the tire building drum. When applying the middle section of the cut strip of material, the tire building drum is rotated at a higher but constant speed while the speed of the conveyor belt is also higher but is controlled as a function of the actual length of the cut strip of material. The first and third circumferential speeds, respectively, the first and third feeding speeds can be identical.

For realizing the invention it is suggested that the circumferential speed (rotational speed) of the tire building drum during application of the forward portion and the end portion of the cut strip of material is substantially synchronous to the feeding speed of the endless conveyor belt supplying the cut strip of material to the tire building drum. For measuring the length of each individual cut strip of material, an electronic measuring device is provided that, for example, operates optoelectronically or capacitively.

Furthermore, with a continuous monitoring of the application and splicing process it can be ensured that optimal results will be achieved. This requires a permanent adjustment possibility of the stretching or compression process. This is possible by monitoring and controlling the gear ratio between the feeding system and the tire building drum during transfer of the cut strip of material onto the tire building drum.

A further object of the present invention is to provide a device with which the aforementioned method can be performed.

According to the present invention, the device, comprising a tire building drum, a conveyor belt as well as an electronic measuring device for measuring the length of a cut strip of material, is designed such that the drives for the tire building drum and for the feeding conveyor belt comprise a control device with which the conveyor belt and the tire building drum, during application of the forward and end portions of the cut strip of material, are advanced with substantially the same low speed, while, when the middle section of the strip of material is to be applied, the building drum and the conveyor belt are driven at a higher speed. During application of this middle section the rotational speed of the tire building drum is constant, while the speed of the conveyor belt is controlled and varied according to the actual length of the cut strip of material.

The inventive control of the speed of the conveyor belt instead of the control of the speed of the tire building drum in connection with the reduced speed of the tire building drum and the conveyor belt, when applying the forward and end portions of the cut strip of material, results in the advantage that each cut strip of material, despite varying length tolerances, can be exactly applied to the tire building drum such that the free ends abut closely, without requiring substantial deformations of the cut materials strip by compression or stretching forces. Furthermore, it is advantageous that a control of the device is considerably facilitated, when controlling the conveyor belt, even when tire building drums of different diameters are used.

BRIEF DESCRIPTION OF THE DRAWINGS

The object and advantages of the present invention will appear more clearly from the following application in conjunction with the accompanying only drawing in which the inventive device and the inventive process are schematically represented.

DESCRIPTION OF PREFERRED EMBODIMENTS

The present invention will now be described in detail with the aid of several specific embodiments utilizing the only FIGURE.

The application and splicing device 10 represented in the only Figure is substantially comprised of a supply roll 11, a conveyor belt 13, and a tire building drum 12. With the conveyor belt 13 cut strips of material 16 can be fed to the tire building drum 12 on which non-represented green tires are to be manufactured.

The endless strip material 17 to be used for the inventive process is supplied by a supply roll 11 and is, for example, in the form of calendered unvulcanized rubber with slantedly oriented reinforcement elements. The quasi continuous strip material 17 can be removed from the supply roll 11 with a removal conveyor belt 14 in order to be fed to the cutting device 15. The cutting device 15 automatically searches for a cutting location between two reinforcement elements present, for example, in the form of textile cords or metal cords, and cuts to length a cut strip of material 16. The length of the cut strip of material 16 substantially matches the circumferential length of the tire building drum 12.

Due to the presence of the slantedly oriented reinforcement elements the cut material strips 16 are cut to the shape of a diamond or rhomboid and therefore have different length. The length differences may be up to 20 mm. Such length tolerances lead either two material gaps or two overlap of material on the tire building drum 12. Both is undesirable for building a tire in which the free ends of the material strips are supposed to abut.

Between the reinforcement elements plastically deformable non-vulcanized rubber is present. Thus, the length of a cut to length strip of material 16 can be shortened by compression or lengthened by stretching. Practically, this is carried out in the middle section of the cut strip of material 16 by changing the relative speed between the variable driven conveyor belt 13 and the tire building drum 12 which is rotated at a constant speed. When the conveyor belt 13 is driven faster than the tire building drum 12, the cut material strip 16 is compressed and thus shortened on the tire building drum 12. When the conveyor belt 13 is driven slower than the tire building drum 12, the material strip 16 is stretched on the tire building drum 12. The speed of the conveyor belt 13 can be varied as a function of the actual length of the cut to length material strip 16. In order to be able to determine the actual length, a measuring device comprising a first measuring unit 18 and a second measuring unit 19 is provided. The units 18, 19 are arranged at the conveyor belt 13. They are used to determine the beginning and the end of the cut strip of material 16. Especially suitable for this purpose are optoelectronic measuring units 18, 19.

Since the material strips 16 are cut in a diamond or rhomboid shape, the forward portion in the form of the tip of a diamond shape is first applied to (placed on) the tire building drum 12. Upon acceleration of the tire building drum 12 pulling forces that, for example, are designed to stretch the cut strip of material 16 would first engage the leading edge or tip of the cut strip of material. This would result in a relatively high specific pulling load and the cut strip of material 16 would thus be reduced in its width.

In the following the inventive method will be described.

Initially, a cut strip of material 16 is cut to length by the cutting device 15 and is placed on the conveyor belt 13. Its length is determined by the optoelectronic measuring units 18, 19.

The speeds of the conveyor belt 13 and the tire building drum 12 are adjusted with the control device 20 such that the initial placing of the tip (leading edge) of the forward portion and the tip (rearward edge) of the end portion of the material strip is performed at low speeds while the application of the middle section of the strip of material 16 is carried out at higher speeds. During application (winding) of the middle section of the material strip 16 on the tire building drum 12, the speed of the tire building drum 12 is maintained constant, while the speed of the conveyor belt 13, depending on deviations of the actual length of the strip of material 16 from the circumferential length of the tire building drum 12, is adjusted to a lower or higher speed. When the speed of the conveyor belt 13 is increased, a compression of the strip of material 16 results, and, when the speed of the conveyor belt 13 is reduced, a stretching of the strip of material 16 results. With the disclosed control action that is performed by the control device 20, it is achieved that the cut strip of material 16 is applied such to the building drum 12 that in the final state the free ends abut one another.

A further refinement of the aforedescribed method can be achieved when, for example, after application of half of the cut strip of material 16, the end of the cut strip of material is detected by the measuring device 18. With a nominal/actual comparison it is then determined by the control device 12 whether the previously performed variation of the speed of the conveyor belt 13 has resulted in the desired correction of the application (placing) of the cut strip of material 16 on the tire building drum 12.

When a deviation is determined, it is thus possible to vary again the speed of the conveyor belt 13 by a small amount so that with a minimal length adjustment of the second half of the cut strip of material 16 the desired final state with exactly abutting ends can be achieved.

The present invention is, of course, in no way restricted to the specific disclosure of the specification and drawings, but also encompasses any modifications within the scope of the appended claims.

What we claim is:

1. A method for automatically applying cut strips of material with varying length tolerances onto a tire building drum for manufacturing green tires; said method comprising the steps of:

feeding a cut strip of material, comprising a forward portion with a leading edge, a middle section, and an end portion, with an endless conveyor belt to a tire building drum;

placing the leading edge of the forward portion onto the tire building drum and rotating the tire building drum at a first circumferential speed while driving the endless conveyor belt at a first feeding speed during application of the forward portion;

increasing the first circumferential speed to a second circumferential speed for applying the middle section;

increasing simultaneously the first feeding speed to a second feeding speed;

maintaining the second circumferential speed constant;

controlling the second feeding speed as a function of the actual length of the cut strip of material so as to compress or stretch the cut strip of material to the nominal length for abutment of the leading edge and the end portion; and reducing the second constant circumferential speed to a third circumferential speed and reducing the second feeding speed to a third feeding speed for applying the end portion.

2. A method according to claim 1, further comprising the steps of synchronizing the first circumferential speed and the first feeding speed and synchronizing the third circumferential speed and the third feeding speed.

3. A method according to claim 1, further comprising the steps of selecting the first feeding speed to be minimally lower than the first circumferential speed and selecting the third feeding speed to be minimally lower than the third circumferential speed in order to prevent bulging of the cut strip of material on the tire building drum.

4. A method according to claim 1, further comprising the step of measuring the length of the cut strip of material with an electronic measuring device.

5. A method according to claim 4, wherein the step of measuring includes the step of positioning the electronic measuring device at the conveyor belt.

\* \* \* \* \*